United States Patent
Kluver et al.

(10) Patent No.: US 9,696,445 B2
(45) Date of Patent: Jul. 4, 2017

(54) SYSTEMS AND METHODS FOR FREQUENCY-DOMAIN FILTERING AND SPACE-TIME DOMAIN DISCRIMINATION OF SEISMIC DATA

(71) Applicant: PGS Geophysical AS, Lysaker (NO)

(72) Inventors: Tilman Kluver, Sande (NO); Anthony James Day, Drammen (NO)

(73) Assignee: PGS Geophysical AS, Oslo (NO)

( * ) Notice: Subject to any disclaimer, the term of this patent is extended or adjusted under 35 U.S.C. 154(b) by 653 days.

(21) Appl. No.: 13/826,008

(22) Filed: Mar. 14, 2013

(65) Prior Publication Data

US 2014/0269183 A1 Sep. 18, 2014

(51) Int. Cl.
G01V 1/38 (2006.01)
G01V 1/36 (2006.01)

(52) U.S. Cl.
CPC .............. *G01V 1/38* (2013.01); *G01V 1/364* (2013.01); *G01V 2210/44* (2013.01)

(58) Field of Classification Search
CPC ....... G01V 1/38; G01V 1/364; G01V 2210/44
USPC .......................................................... 367/27
See application file for complete search history.

(56) References Cited

U.S. PATENT DOCUMENTS

| 7,359,283 | B2 | 4/2008 | Vaage et al. | |
|---|---|---|---|---|
| 7,684,281 | B2 | 3/2010 | Vaage et al. | |
| 2003/0048696 | A1* | 3/2003 | Duren | G01V 1/364 367/24 |
| 2004/0054479 | A1* | 3/2004 | Trickett | G01V 1/36 702/14 |
| 2005/0265122 | A1* | 12/2005 | Grion | G01V 1/364 367/21 |
| 2008/0049551 | A1* | 2/2008 | Muyzert | G01V 1/364 367/24 |
| 2008/0094940 | A1* | 4/2008 | Brumley | G01C 13/002 367/90 |

(Continued)

FOREIGN PATENT DOCUMENTS

WO 2008/008651 A2 1/2008

OTHER PUBLICATIONS

Naghizadeh, Seismic data interpolation and de-noising in the frequency-wavenumber domain, 2012.*

(Continued)

*Primary Examiner* — Luke Ratcliffe
*Assistant Examiner* — Amie M N'Dure

(57) ABSTRACT

Computational systems and methods that combine global frequency-wavenumber-domain ("f-k domain") filters with localized eigenimage based event selection to generate a resulting wavefield with reduced filter imprints on gather edges, reduced noise, and correct treatment of aliased energy are disclosed. The methods are executed by applying filters to the full set of seismic gather data in the f-k domain in order to obtain a resulting wavefield from recorded pressure and/or particle velocity data. The output of the filter is iteratively decomposed according to local dip values using eigenimage processing based on singular value decomposition ("SVD"). The same sample locations are extracted using SVD from the input in addition to generating input for a subsequent iteration with already processed data removed. Eigenimage processing methods allow for correct treatment of spatially aliased energy in f-k domain filtering.

27 Claims, 14 Drawing Sheets

(56) References Cited

U.S. PATENT DOCUMENTS

| | | | | |
|---|---|---|---|---|
| 2010/0039894 A1* | 2/2010 | Abma | ............... | G01V 1/362 |
| | | | | 367/52 |
| 2010/0124149 A1* | 5/2010 | Barr, Jr. | ............... | G01V 1/3808 |
| | | | | 367/24 |
| 2010/0135113 A1* | 6/2010 | Cambois | ............... | G01V 1/364 |
| | | | | 367/21 |
| 2011/0090760 A1* | 4/2011 | Rickett | ............... | G01V 1/282 |
| | | | | 367/73 |
| 2012/0008458 A1* | 1/2012 | Moldoveanu | ............... | G01V 1/36 |
| | | | | 367/21 |
| 2012/0155218 A1* | 6/2012 | Beasley | ............... | G01V 1/364 |
| | | | | 367/46 |

OTHER PUBLICATIONS

Trickett, F-xy eigenimage noise suppression; Geophysics. vol. 68 No. 2 (Mar.-Apr. 2003) p. 751-759.*
Neidell, N.S., et al., "Semblance and other Coherency Measures for Multichannel Data", Geophysics, vol. 36, No. 3, Jun. 1971, pp. 482-497.
Taner, M.T., et al., "Complex seismic trace analysis", Geophysics, vol. 44, No. 6, Jun. 1979, pp. 1041-1063.
European Search Report, Application No. 14158632.1, Dec. 17, 2015.

* cited by examiner $$A = \begin{bmatrix} a_{11} & a_{12} & \cdots & a_{1n} \\ a_{21} & a_{22} & & \\ \vdots & & \ddots & \\ a_{m1} & & & a_{mn} \end{bmatrix} \quad /902$$

$$= USV^T \quad /904$$

$$= \underbrace{\begin{bmatrix} \vec{u}_1 & \vec{u}_2 & \cdots & \vec{u}_n \end{bmatrix}}_{m \times n} \underbrace{\begin{bmatrix} s_1 & 0 & \cdots & 0 \\ 0 & s_2 & & \\ \vdots & & \ddots & \\ 0 & & & s_n \end{bmatrix}}_{n \times n} \underbrace{\begin{bmatrix} \vec{v}_1 & \vec{v}_2 & \cdots & \vec{v}_n \end{bmatrix}^T}_{n \times n}$$

where $$\vec{u}_\beta = \begin{bmatrix} u_{1\beta} \\ u_{2\beta} \\ \vdots \\ u_{m\beta} \end{bmatrix} \quad \vec{v}_\beta = \begin{bmatrix} v_{1\beta} \\ v_{2\beta} \\ \vdots \\ v_{n\beta} \end{bmatrix} \quad s_\beta = \sqrt{\varepsilon_\beta}$$

SYSTEMS AND METHODS FOR FREQUENCY-DOMAIN FILTERING AND SPACE-TIME DOMAIN DISCRIMINATION OF SEISMIC DATA

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and improved reservoir monitoring. For a typical marine seismic survey, an exploration-seismology vessel tows a seismic source and one or more streamers that form a seismic data acquisition surface below the surface of the water and over a subterranean formation to be surveyed for mineral deposits. The vessel contains seismic acquisition equipment, such as navigation control, seismic source control, seismic receiver control, and recording equipment. The seismic source control causes the seismic source, which is typically an array of source elements, such as air guns, to produce acoustic impulses at selected times. Each impulse is a sound wave that travels down through the water and into the subterranean formation. At each interface between different types of rock, a portion of the sound wave is refracted, a portion of the sound wave is transmitted, and another portion is reflected back toward the body of water to propagate toward the surface. The streamers towed behind the vessel are elongated cable-like structures. Each streamer includes a number of seismic receivers or sensors that detect pressure and/or velocity wavefields associated with the sound waves reflected back into the water from the subterranean formation. The pressure and velocity wavefields measured at the acquisition surface are processed to produce seismic images of a subterranean formation. However, obtaining a focused image of the subterranean formation is often complicated by the pressure and velocity wavefields being contaminated with noise. As a result, researchers, developers, and practitioners of exploration-seismology-related analytical methods continue to seek computationally efficient approaches to filter the noise.

DESCRIPTION OF THE DRAWINGS

FIG. 9 shows mathematical operations of SVD.

DETAILED DESCRIPTION

This disclosure presents computational systems and methods that combine global frequency-wavenumber-domain ("f-k domain") filters with localized eigenimage based event selection, (e.g. eigenimages based on singular value decomposition ("SVD")), to generate a resulting wavefield with reduced filter imprints on gather edges, reduced filter imprints on noise, and correct treatment of aliased energy. The methods are executed by applying filters to the full set of seismic gather data in the f-k domain in order to obtain a resulting wavefield from recorded pressure and/or particle velocity data. The filter can be any filter used in the f-k domain. The output of the filter is iteratively decomposed, either sample by sample or in small overlapping data windows, according to local dips using eigenimage processing based on SVD. The same sample locations are extracted using SVD from the input in addition to generating input for a subsequent iteration with already processed data removed. The iterative approach ensures appropriate handling of conflicting dip values. By decomposing the data into local events with known dips, spatial aliasing limitations of global operators can be overcome.

Figure 1A:
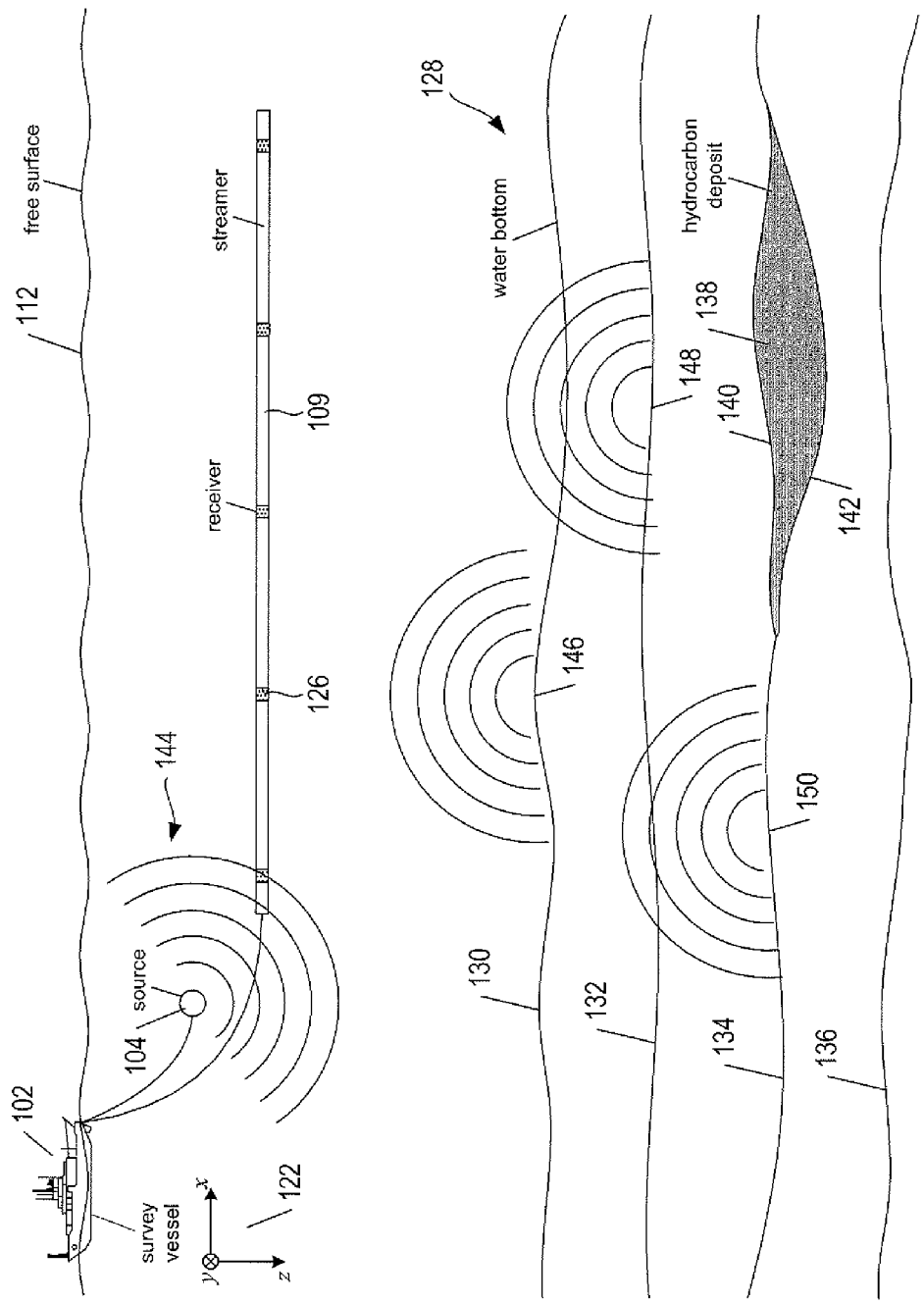
FIGS. 1A-1B show a side elevation and top views, respectively, of a marine seismic data acquisition system.
Figure 1B:
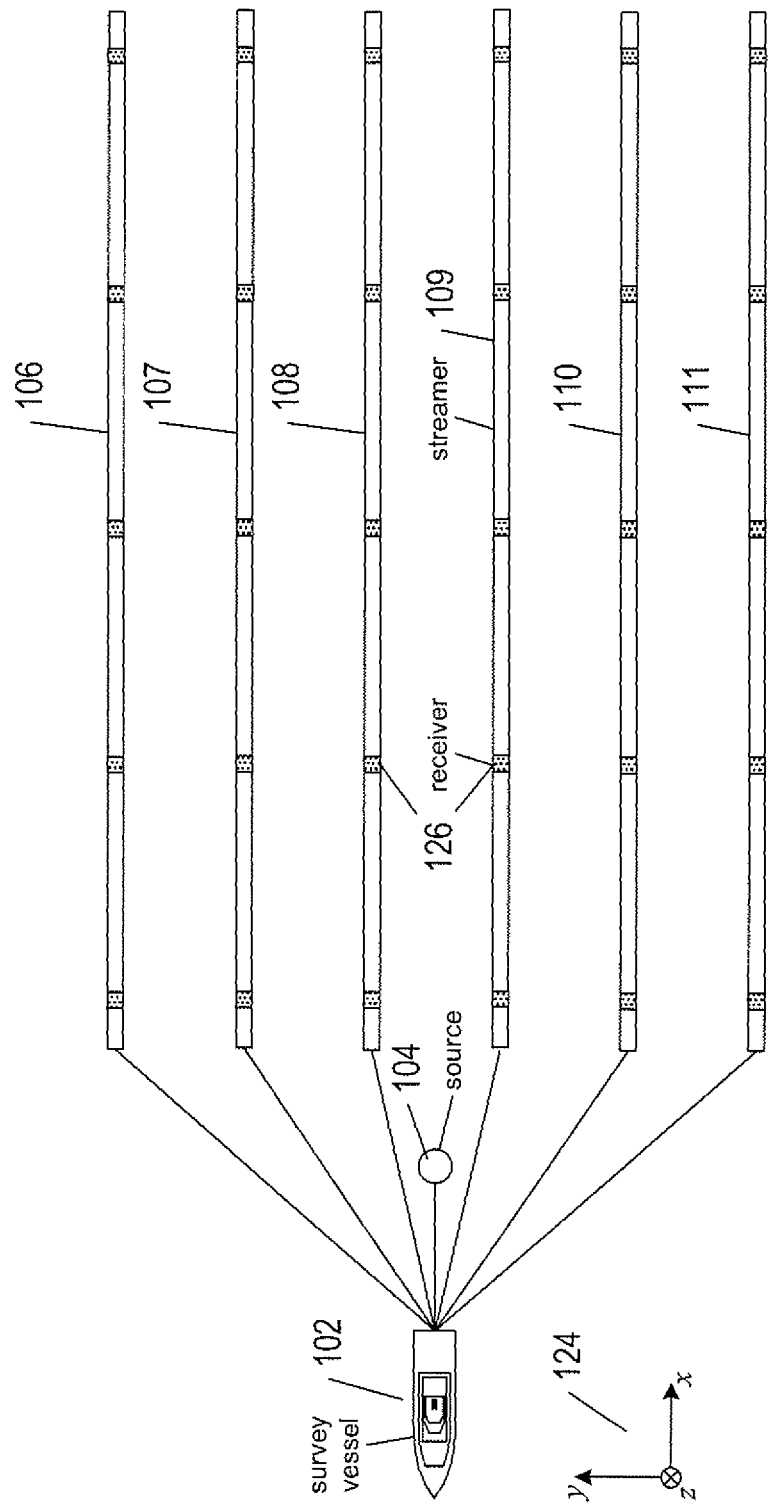

FIGS. 1A-1B show a side-elevation view and a top view, respectively, of a marine seismic data acquisition system composed of an exploration seismology survey vessel 102 towing a source 104 and six separate streamers 106-111 located beneath a free surface 112. In this example, each streamer is attached at one end to the survey vessel 102 via a streamer-data-transmission cable. In the example of FIGS. 1A-1B, the streamers 106-111 form a planar horizontal receiver acquisition surface located beneath the free surface 112. However, in practice, the receiver acquisition surface may be smoothly varying due to active sea currents and weather conditions. In other words, although the streamers 106-111 are illustrated in FIGS. 1A and 1B as being straight, in practice, the towed streamers may undulate as a result of dynamic conditions of the body of water in which the streamers are submerged. It should be noted that a receiver acquisition surface is not limited to having a horizontal orientation with respect to the free surface 112. The streamers may be towed at depths that orient the receiver acquisition surface at an angle with respect to the free surface 112 or so that one or more of the streamers are towed at different depths. It should also be noted that a receiver acquisition surface is not limited to six streamers as shown in FIG. 1B. In practice, the number of receivers used to form a receiver acquisition surface can range from as few as one streamer to as many as 20 or more streamers.

FIG. 1A includes an xz-plane 122 and FIG. 1B includes an xy-plane 124 of the same Cartesian coordinate system having three orthogonal, spatial coordinate axes labeled x, y and z. The coordinate system is used to specify orientations and coordinate locations within a body of water. The x-direction specifies the position of a point in a direction parallel to the length of the streamers and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. Streamer depth below the free surface 112 can be estimated at various locations along the streamers using depth measuring devices attached to the streamers. For example, the depth measuring devices can measure pressure or utilize acoustic distance measurements. The depth measuring devices can be integrated with depth controllers, such as paravanes or water kites that control and maintain the depth and position of the streamers as the streamers are towed through a body of water. The depth measuring devices are typically placed at intervals (e.g., about 300 meter intervals) along each streamer. Note that in other embodiments buoys may be can be used to maintain the orientation and depth of the streamers below the free surface 112.

In FIGS. 1A-1B, shaded rectangles 126 represent receivers or sensors that are spaced-apart along the length of each streamer. The streamers 106-111 are long cables containing power and data-transmission lines that connect the receivers 126 to seismic acquisition equipment located on board the survey vessel 102. Each receiver may be a dual sensor including a particle motion sensor that detects vertical displacement within the body of water over time by detecting particle motion, velocities or accelerations, and a pressure sensor that detects variations in water pressure over time. In other embodiments, each receiver may be a multi-component sensor composed of a pressure sensor and two or more particle motion sensors that record displacement in two or more different directions, such as a three-component motion sensor that records particle motion in the vertical, in-line, and cross-line directions.

FIG. 1A shows a cross-sectional view of the survey vessel 102 towing the source 104 and streamers above a subterranean formation 128. Curve 130 represents a surface at the bottom of a body of water located above the subterranean formation 128. The subterranean formation 128 is composed of a number of subterranean layers of sediment and rock. Curves 132, 134, and 136 represent interfaces between subterranean layers of different compositions. A shaded region 138, bounded at the top by a curve 140 and at the bottom by a curve 142, represents a hydrocarbon-rich subterranean deposit, the depth and positional coordinates of which may be determined by analysis of seismic data collected during a marine seismic survey. As the survey vessel 102 moves over the subterranean formation 128 the source 104 produces pressure waves at spatial and temporal intervals. In other embodiments, the source 104 may be towed by a separate survey vessel or a number of sources may be towed by a number of different vessels. Source 104 may be an air gun, marine vibrator, or an array of air guns and/or marine vibrators. FIG. 1A illustrates a pressure wave in the form of an acoustic impulse expanding outward from the source 104 as a pressure wavefield 144 represented by semicircles of increasing radius centered at the source 104. The wavefronts are, in effect, shown in vertical plane cross section in FIG. 1A. The outward and downward expanding portion of the pressure wavefield 144 is called the "primary wavefield," which eventually reaches the surface 130 of the subterranean formation 128, at which point the primary wavefield is partially reflected from the surface 130 and partially refracted downward into the subterranean formation 128, becoming elastic waves within the subterranean formation 128. In other words, in the body of water, the acoustic impulse is composed of compressional pressure waves, or P-waves, while in the subterranean formation 128, the waves include both P-waves and transverse waves, or S-waves. Within the subterranean formation 128, at each interface between different types of materials or at discontinuities in density or in one or more of various other physical characteristics or parameters, downward propagating waves are partially reflected and partially refracted. As a result, each point of the surface 130 and each point of the interfaces within the underlying subterranean formation 128 becomes a potential secondary point source from which acoustic and elastic wave energy, respectively, may emanate upward toward the receivers 126 in response to the acoustic impulse generated by the source 104 and downward-propagating elastic waves generated from the pressure impulse. As shown in FIG. 1A, secondary waves of significant amplitude are generally emitted from points on or close to the surface 130, such as point 146, and from points on or very close to interfaces in the subterranean formation 128, such as points 148 and 150. Tertiary waves called "receiver ghosts" are produced by secondary waves that are reflected from the free surface 112 back towards the streamers 106-111 and the subterranean formation 128.

The secondary waves are generally emitted at different times within a range of times following the initial acoustic impulse. A point on the surface 130, such as the point 146, receives a pressure disturbance corresponding to the initial acoustic impulse more quickly than a point within the subterranean formation 128, such as points 148 and 150. Similarly, a point on the surface 130 directly beneath the source 104 receives the acoustic impulse sooner than a more distant-lying point on the surface 130. Thus, the times at which secondary and higher-order waves are emitted from various points within the subterranean formation 128 are related to the distance, in three-dimensional space, of the points from the source 104.

Acoustic and elastic waves, however, travel at different velocities within different materials as well as within the same material under different pressures. Therefore, the travel times of the primary wavefield and secondary wavefield emitted in response to the primary wavefield are functions of distance from the source 104 as well as the materials and physical characteristics of the materials through which the primary wave travels. In addition, the secondary expanding wavefronts may be altered as the wavefronts cross interfaces and as the velocity of sound varies in the media are traversed by the wave. The superposition of waves emitted from within the subterranean formation 128 in response to the primary wavefield is a generally very complicated wavefield that includes information about the shapes, sizes, and material characteristics of the subterranean formation 128, including information about the shapes, sizes, and locations of the various reflecting features within the subterranean formation 128 of interest to exploration seismologists.

Figure 2:
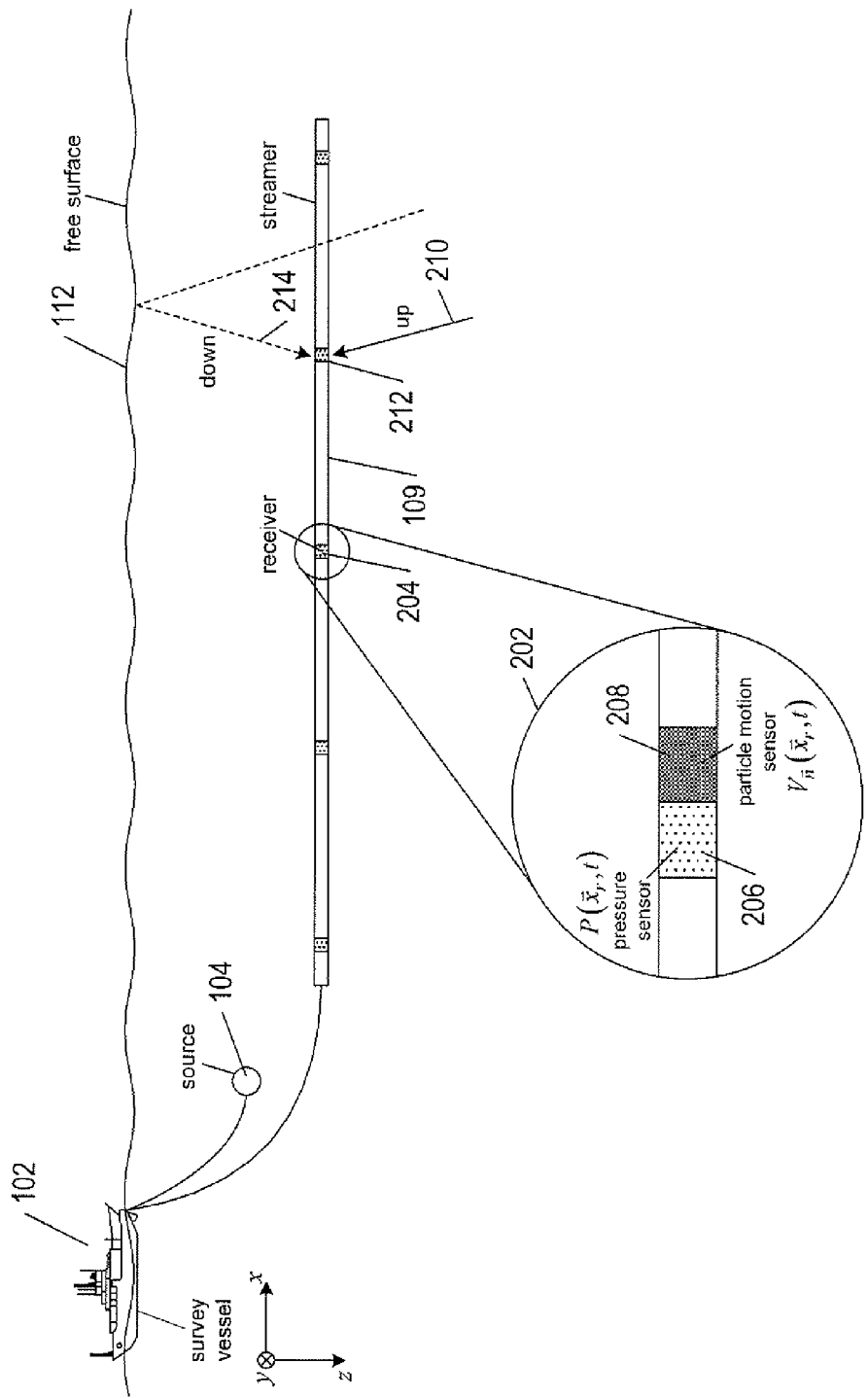
FIG. 2 shows a side-elevation view of a marine seismic data acquisition system with a magnified view of a receiver.

FIG. 2 shows a side-elevation view of the marine seismic data acquisition system with a magnified view 202 of a receiver 204. The magnified view 202 reveals that the receiver is a dual sensor composed of a pressure sensor 206 and a particle motion sensor 208. The pressure sensor may be a hydrophone. Each pressure sensor measures changes in pressure over time and produces pressure data that may be represented by:

$$P(\vec{x}_r, t) = A(t)\sin(\vec{x}_r \cdot \vec{k} + 2\pi f t) \quad (1)$$

where
t represents time;
subscript r is a receiver index;
$\vec{x}_r$ are the coordinates of the receiver;
A (t) is the time-dependent amplitude of the pressure data;
f represents frequency; and
$\vec{k}$ is the wave vector.

The motion sensors are responsive to motions of the particles of the water. In general, a particle motion sensor records motion in a single direction. In order to record the complete particle motion wavefield, at least three non-coplanar particle motion sensors are used and may be responsive to the displacement of the particles, the velocity of the particles, or the acceleration of the particles in the water. The motion sensor data produced by the particle motion sensors is converted to particle motion velocity data. When motion sensors that are responsive to position are used, the motion sensor data is differentiated to convert the data to particle motion velocity data. When motion sensors that are responsive to acceleration (i.e., accelerometers) are used, the particle acceleration data is integrated to convert the data to particle motion velocity data. The resulting data produced by the motion sensors is particle motion velocity data that may be represented by:

$$V_{\vec{n}}(\vec{x}_r,t)=a(t)\sin(\vec{x}_r \cdot \vec{k} + 2\pi ft) \qquad (2)$$

where
a(t) is the time-dependent amplitude of the velocity data; and
subscript vector $\vec{n}$ is a unit vector that represents the orientation of particle motion to which the sensor is sensitive.

For example, in a dual-sensor streamer, the direction $\vec{n}$ is typically normal to the data acquisition surface. The streamers 106-111 and the vessel 102 may include sensing electronics and data-processing facilities that allow measurements from each receiver to be correlated with absolute positions on the free surface 112 and absolute three-dimensional positions with respect to an arbitrary three-dimensional coordinate system. The pressure data and particle motion velocity data represent pressure and velocity wavefields and are, therefore, also referred to as the pressure wavefield and velocity wavefield, respectively.

In FIG. 2, directional arrow 210 represents the direction of an up-going wavefield detected by a receiver 212 and dashed arrow 214 represents a down-going wavefield produced by up-going wavefield reflection from the free surface 112 before reaching the receiver 212. In other words, the pressure wavefield $P(\vec{x}_r, t)$ is composed of an up-going pressure wavefield component and a down-going pressure wavefield component, and the velocity wavefield $V_{\vec{n}}(\vec{x}_r, t)$ is composed of an up-going velocity wavefield component and a down-going velocity wavefield component. The down-going wavefield is called a receiver ghost that contaminates pressure and particle motion velocity data and creates notches in the spectral domain. Filtering is done to remove the down-going wavefields from the pressure and particle motion velocity data leaving the up-going wavefields which are used to generate images of the subterranean formation.

Each pressure sensor and motion sensor of a receiver generates seismic data called a "trace." A trace is a recording of a subterranean formation response to acoustic energy that passes from the source 104, through subterranean layers, and is ultimately reflected to a receiver. A trace generated by a sensor is a record of variations in a time-dependent amplitude that represents acoustic energy in the secondary wavefield measured by the sensor. A secondary wavefield typically arrives first at the receiver located closest to the source 104. The distance between the source 104 to a receiver is called the source-receiver offset, which creates a delay in the arrival time of a secondary wavefield from a substantially horizontal interface within the subterranean formation.

Figure 3:
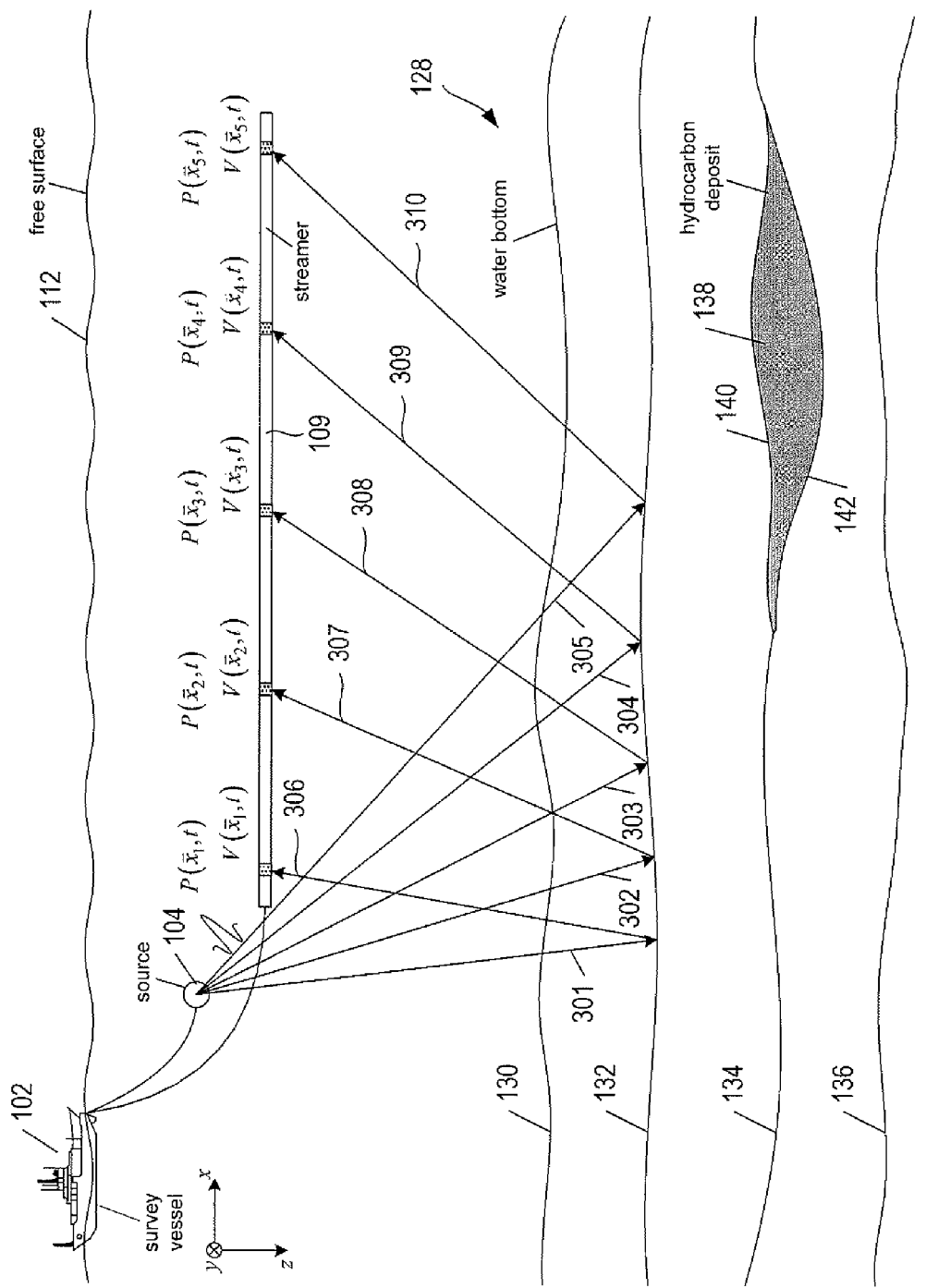
FIG. 3 shows ray paths that represent a primary wavefield interaction with a subterranean interface and subsequent detection at streamer receivers.

FIG. 3 shows ray paths 301-305 that represent paths of the primary wavefield from the source 104 to the interface 132. Rays 306-310 represent the paths of acoustic energy reflected from the interface 132 (i.e., secondary wavefields) to the receivers located along the streamer 109. Each of pressure sensor measures the pressure $P(\vec{x}_r, t)$ and each motion sensor measures particle motion velocity $V_{\vec{n}}(\vec{x}_r, t)$ of the acoustic energy reflected from the interface 132. The pressure data $P(\vec{x}_r, t)$ and particle motion velocity data $V_{\vec{n}}(\vec{x}_r, t)$ measured by each receiver are time sampled and recorded as separate traces.

Figure 4:
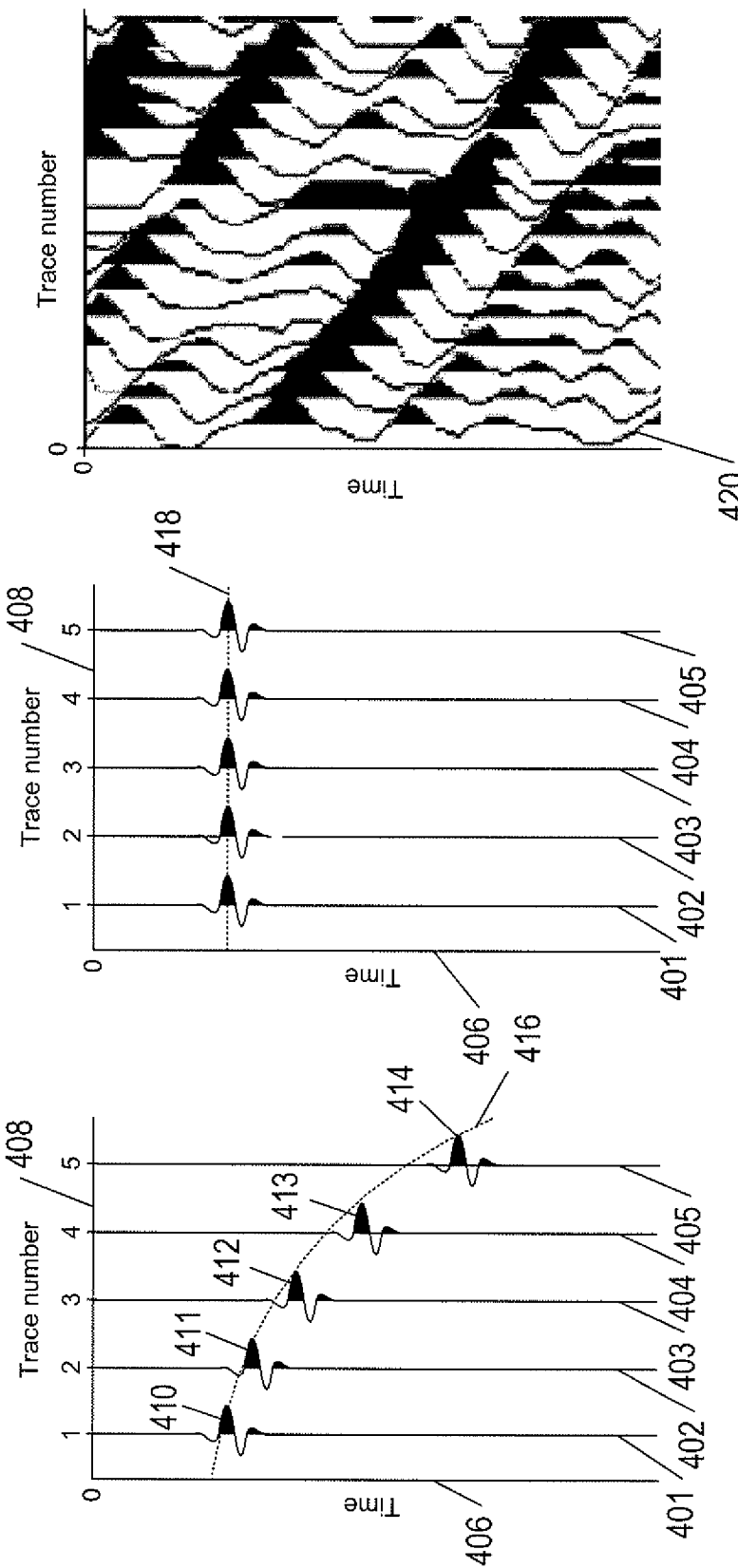
FIG. 4A shows a plot of an example gather of traces associated with detection of acoustic energy reflected from a single interface of a subterranean formation.
FIG. 4B shows a gather of traces after normal moveout.
FIG. 4C shows an example of seismic gather composed of sixteen traces.

FIG. 4A shows a plot of a shot-point gather of example traces 401-405 associated with detection of the acoustic energy reflected from the interface 132 by the five receivers located along the streamer 109 shown in FIG. 3. Vertical axis 406 represents time and horizontal axis 408 represents trace numbers with trace "1" representing the seismic data generated by the receiver located closest to the source 104 and trace "5" representing the seismic data generated by the receiver located farthest from the source 104. The traces 401-405 can represent variation in the amplitude of either the pressure data $P(\vec{x}_r, t)$ or the velocity data $V_{\vec{n}}(\vec{x}_r, t)$ measured by corresponding sensors of the five receivers. The example traces include pulses 410-414 that represent arrival of just the acoustic energy of reflections from the interface 132. Peaks, colored black, and troughs of each trace represent acoustic energy measured by the pressure sensors or motion sensors, in which the vertical axis of a trace is the travel time of the acoustic energy from source to interface to receiver, and the peaks and troughs indicate pressure changes relative to the background hydrostatic pressure or particle velocity recorded by the pressure or motion sensor. Note that the arrival times versus source-receiver offset is longer with increased source-receiver offset and, in this example, has a hyperbolic shape 316. The traces from different source-receiver pairs may be corrected during seismic data processing to remove the effects of different source-receiver offsets in a process called "normal moveout" ("NMO"). FIG. 4B shows a gather of the traces 410-414 after NMO has been applied to align the pulses in time as represented by horizontal line 418. After NMO corrections, traces from different shot records with a common reflection point can be stacked to form a single trace during seismic data processing. Stacking improves the signal-to-noise ratio, reduces noise, improves seismic data quality, and reduces the amount of data. A typical trace does not represent a single reflection from a single interface, as represented in FIGS. 4A-4B. In practice, a trace represents the time-dependent amplitude of pressure change or particle velocity associated with numerous reflections of acoustic energy from within the subterranean formation. FIG. 4C shows a gather of 15 traces recorded over a period of time. Each trace, such as trace 420, has variation in amplitude over time and represents acoustic energy reflected from interfaces within a subterranean formation as measured by a pressure sensor or a motion sensor of a receiver. The gather shown in FIG. 4C can, for example, represent a source-receiver gather, a common-receiver gather, or a common-midpoint gather.

Figure 5:
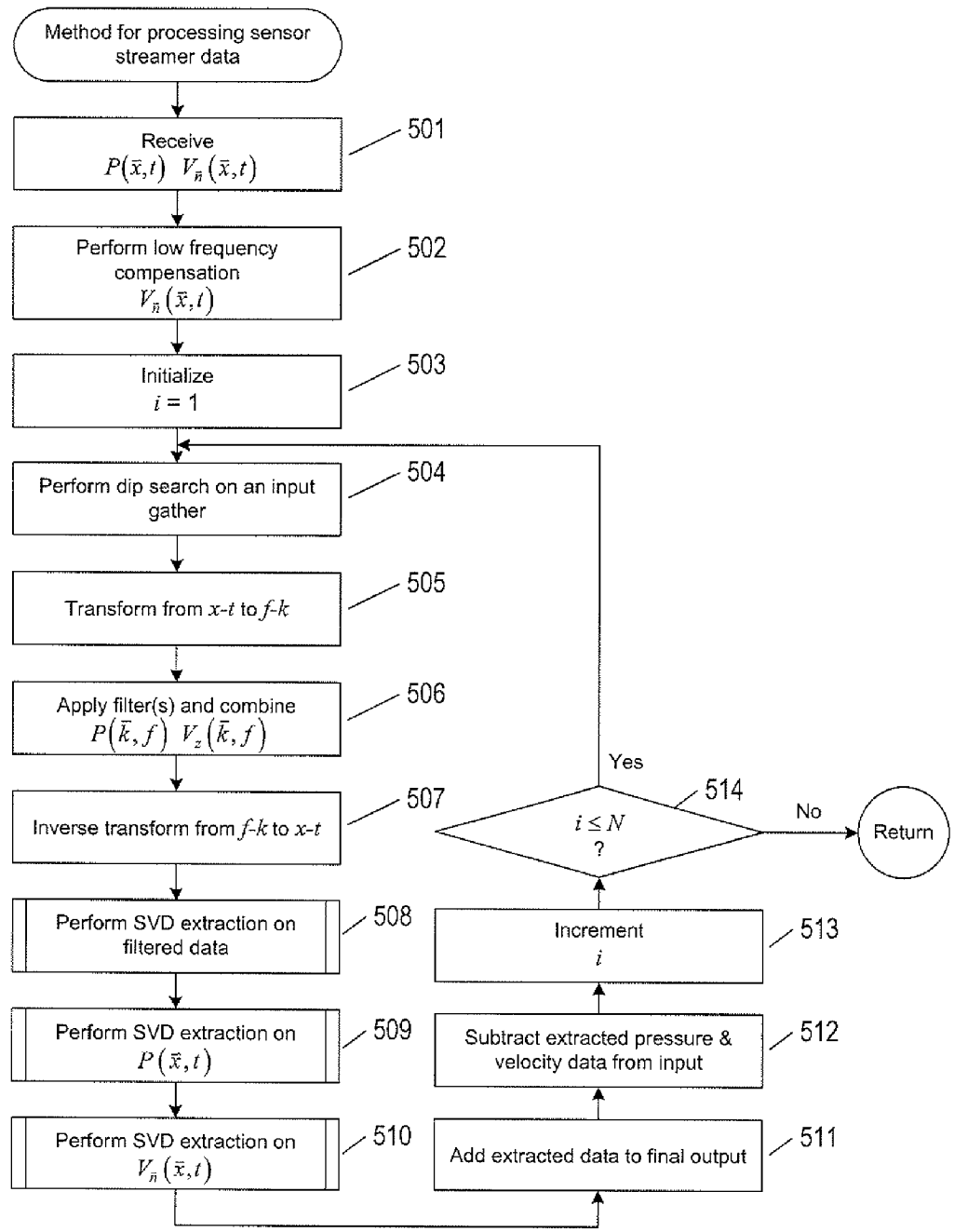
FIG. 5 shows a flow-control diagram of a method for frequency-wavenumber domain filtering and localized singular value decomposition ("SVD").

FIG. 5 shows a flow-control diagram of a method for f-k domain filtering and localized SVD event selection to generate a filtered up-going pressure wavefield denoted by $P^{up}(\vec{x}_r, t)$. In block 501, pressure data $P(\vec{x}_r, t)$ and particle motion velocity data $V_{\vec{n}}(\vec{x}_r, t)$ are received as input. The pressure data and velocity data may be sorted into gathers, such as source-receiver gathers, common-receiver gathers, or common-midpoint gathers. In block 502, low frequency compensation is performed on the particle motion velocity data $V_{\vec{n}}(\vec{x}_r, t)$. Recorded particle motion data is often contaminated with low frequency noise due to the vibrations in a towed streamer. The low frequency part of the velocity data may have to be replaced because the velocity data typically has such a low signal-to-noise ratio over this low frequency range. Velocity data over the low frequency range may be calculated from the pressure data over the same low frequency range when the spectrum of the pressure data has a satisfactory signal-to-noise ratio, no spectral notches within the low frequency range, and the depth of the receivers are known. When the depths of the streamers are unknown, the depths can be estimated from the frequency spacing of spectral notches in the pressure data frequency spectrum. As a result, the depth of the streamers is often selected so that the frequency of the first spectral notch in the pressure data is higher than the low frequency range over which the velocity data is contaminated. Spectral notches are caused by the receiver ghosts described above. Methods for using pressure data to compensate for velocity data contaminated with low frequency noise are described in U.S. Pat. Nos. 7,684,281 and 7,359,283 owned by PGS America, Inc. The operations performed in blocks 504-514 are repeated for a number of iterations N. The number of iterations N may be set by the user to a fixed number that is known in advance. Alternatively, N may be determined while the iterative process is running. The iterative process in blocks 504-512 may be stopped when the energy level in the residual data falls below a user specified threshold. For example, when the residual energy is less than or equal to 2% of the original energy in the input data. The number of iterations when this energy level is reached determines N. In this example, N is not known in advance. In block 503, a positive integer index i is initialized to one and is used to keep track of the number of iterations and the output data denoted by $R(\vec{x}_r, t)$ is initialized to zero. For each iteration of the operations performed in blocks 503-514, a portion of the data is processed and added to the output while the corresponding data is subtracted from the input. In block 504, a dip search is performed on one or more of the input data gathers to generate a set of dip values. The dip values are restricted to a range of values between −1/c and 1/c, where c represents the acoustic wave propagation velocity in water, which is typically about 1500 m/s. Each dip value is an inverse velocity with units of s/m. For example, the number of dip values may range from about 100 to 150. The dip values are input to a routine "perform SVD extraction" called in blocks 508-510.

Figure 6:
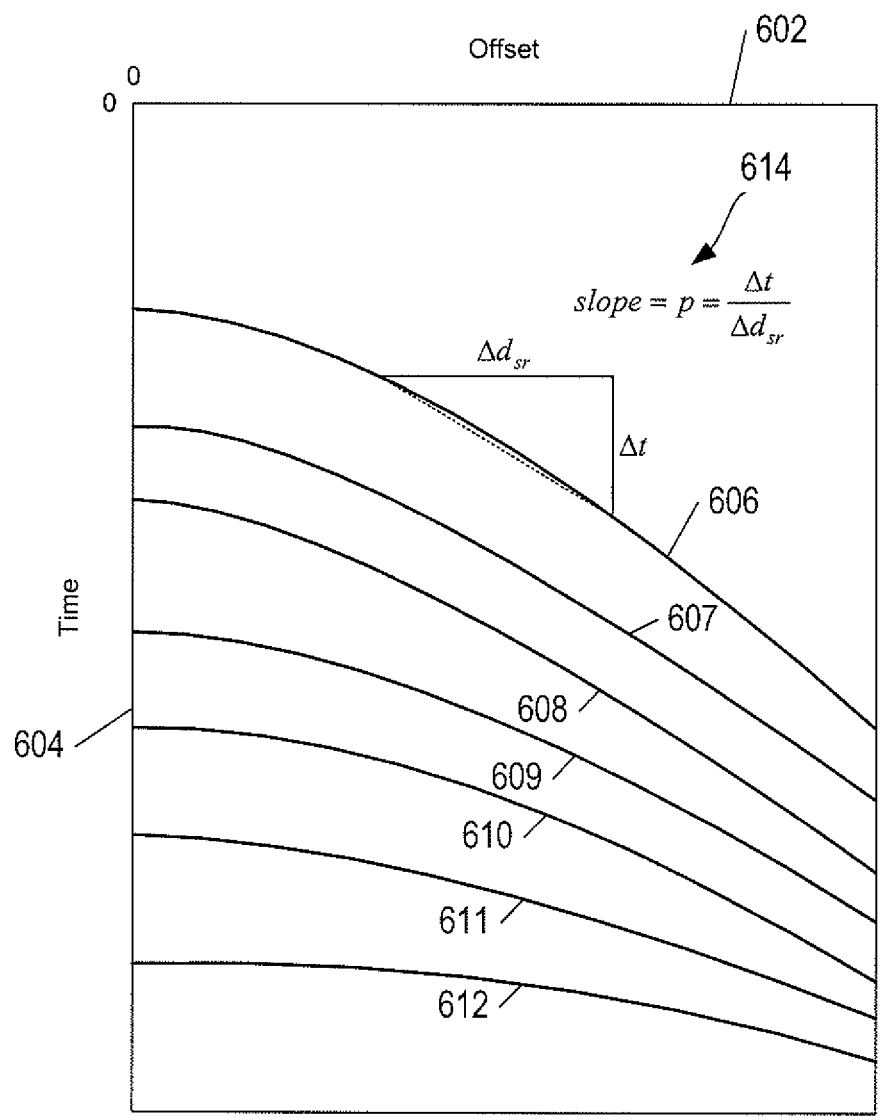
FIG. 6 shows an example of hydrophone gather data.

FIG. 6 shows an example of pressure source-receiver gather. Horizontal axis 602 represents source-receiver offset, and vertical axis 604 represents time. Source-receiver offset is the distance from the source, such as source 104, to a receiver in a line of receivers, such as the receivers located along a streamer. Curves 606-612 represent reflections from interfaces in a subterranean formation. A dip value, denoted by p, may be determined as the average or approximate slope 614 of a curve that corresponds to reflections from an interface.

In block 505, the pressure data $P(\vec{x}_r, t)$ and the velocity data $V_{\vec{n}}(\vec{x}_r, t)$ are transformed from the space-time domain ("x-t domain") to the frequency-wavenumber domain ("f:k domain") using a Fourier transform:

$$P(\vec{x}_r, t) \xrightarrow{FT} P(\vec{k}, f) \qquad (3a)$$

$$V_{\vec{n}}(\vec{x}_r, t) \xrightarrow{FT} V_{\vec{n}}(\vec{k}, f) \qquad (3b)$$

For computational efficiency and speed the Fourier transformation can be a fast Fourier transform ("FFT").

In block 506, a filter is applied to the pressure and/or particle motion data, which are then combined in order to remove an unwanted component or feature from the pressure or particle motion data producing resulting filtered output data denoted by $R(\vec{k}, f)$. The filtered output data $R(\vec{k}, f)$ is a wavefield in the frequency-wavenumber domain. For example, as described above with reference to FIG. 2, the pressure data $P(\vec{x}_r, t)$ measured by the pressure sensors is often contaminated with receiver ghosts, which are the down-going wavefields reflected from the free surface. In this case, the filter is obliquity scaling applied to the vertical velocity data followed by summation with the pressure data as follows:

$$P^{up}(\vec{k}, f) = \frac{1}{2}\left(P(\vec{k}, f) - \frac{f\rho}{k_z} V_{\vec{n}}(\vec{k}, f)\right) \qquad (4)$$

where
ρ is the density of the water in which the pressure and particle motion are measured, $$k_z = \sqrt{\frac{\omega^2}{c^2} - k_y^2 - k_x^2},$$

and
fπ/$k_z$ is the obliquity scaling.
In this example, the filtered output data is the up-going pressure wavefield $P^{up}(\vec{k}, f)$ in the frequency-wavenumber domain.

In block 507, the filtered output data $R(\vec{k}, f)$ is transformed from the f-k domain to the x-t domain using an inverse Fourier transform:

$$R(\vec{k}, f) \xrightarrow{IFT} R(\vec{x}_r, t) \qquad (5)$$

For computational efficiency and speed the inverse Fourier transformation can be an inverse fast Fourier transform ("IFFT").

In blocks 508-510, a routine called "perform SVD extraction" is called. In block 508, SVD extraction is applied to the filtered data $R(\vec{x}_r, t)$ to produce extracted data $R_{ex}(\vec{x}_r, t)$, respectively. The extracted data is $R_{ex}(\vec{x}_r, t)$ is an extracted wavefield in the space-time domain. For example, the extracted data $R_{ex}(\vec{x}_r, t)$ can be an extracted up-going pressure wavefield $P_{ex}^{up}(\vec{x}_r, t)$ in the space-time domain. In block 509, SVD extraction is applied to the pressure data $P(\vec{x}_r, t)$ to produce extracted pressure data $P_{ex}(\vec{x}_r, t)$. In block 510, SVD extraction is applied to the velocity data $V_{\vec{n}}(\vec{x}_r, t)$ to produce extracted velocity data $V_{\vec{n},ex}(\vec{x}_r, t)$. In block 511, the extracted output data $R_{ex}(\vec{x}_r, t)$ of the current iteration is added to the stored output data. In other words, for each iteration of blocks 504-511, the output data is determined by filtering in block 506 to obtain $R(\vec{x}_r, t)$ and SVD extraction is used in block 508 to obtain extracted output data $R_{ex}(\vec{x}_r, t)$. In block 511, the final output data is accumulated incrementally with each iteration). In block 512, the extracted pressure data is subtracted from the input pressure data, and the extracted velocity data is subtracted from the input velocity data to give residual pressure and velocity data:

$$P_{res}(\vec{x}_r, t) = P(\vec{x}_r, t) - P_{ex}(\vec{x}_r, t) \quad (6a)$$

$$VV_{\vec{n},res}(\vec{x}_r, t) = V_{\vec{n}}(\vec{x}_r, t) - V_{\vec{n},ex}(\vec{x}_r, t) \quad (6b)$$

In block 513, the index i is incremented. In block 514, when the index i is less than N, the operations of blocks 503-513 are repeated. For the next iteration, the residual pressure data and particle motion data given by Equations (4a-4b) will contain fewer reflection events because the reflection events identified by the previous dip search performed in block 503 have been removed from the input data. Because there typically are a number of reflection events that interfere at any given time sample, a new dip search is performed in block 503 on the residual pressure data and velocity data, which will identify progressively less energetic events with each iteration because the more energetic events have already been removed from the input. The dip search can be stopped after the fixed number of iterations, N.

In other embodiments, rather than using a fixed number N of iterations, a stop criterion can be when the residual energy in the input data falls below a predefined energy threshold of the original input data, which indicates that the majority of the energy in the input data has been processed and added to the output. In each iteration of blocks 504-512, a portion of the input data to the iteration is extracted. As a result, the input to the next iteration contains fewer reflection events. Although is impossible to count these reflection events, the associated energy levels can be measured. For example, the energy levels can be approximated by calculating the root-mean-squared ("RMS") amplitude level of a seismic trace. In each iteration, this energy level will decrease. A stop criterion in block 514 may be when the RMS amplitude falls below a certain percentage of the energy level in the original input data. The user may set a desired residual energy level, such as 2%, and the iterative process will automatically stop when this residual energy level is reached. The number of iterations at that point determines N, which is not known a-priori in this embodiment.

Figure 7:
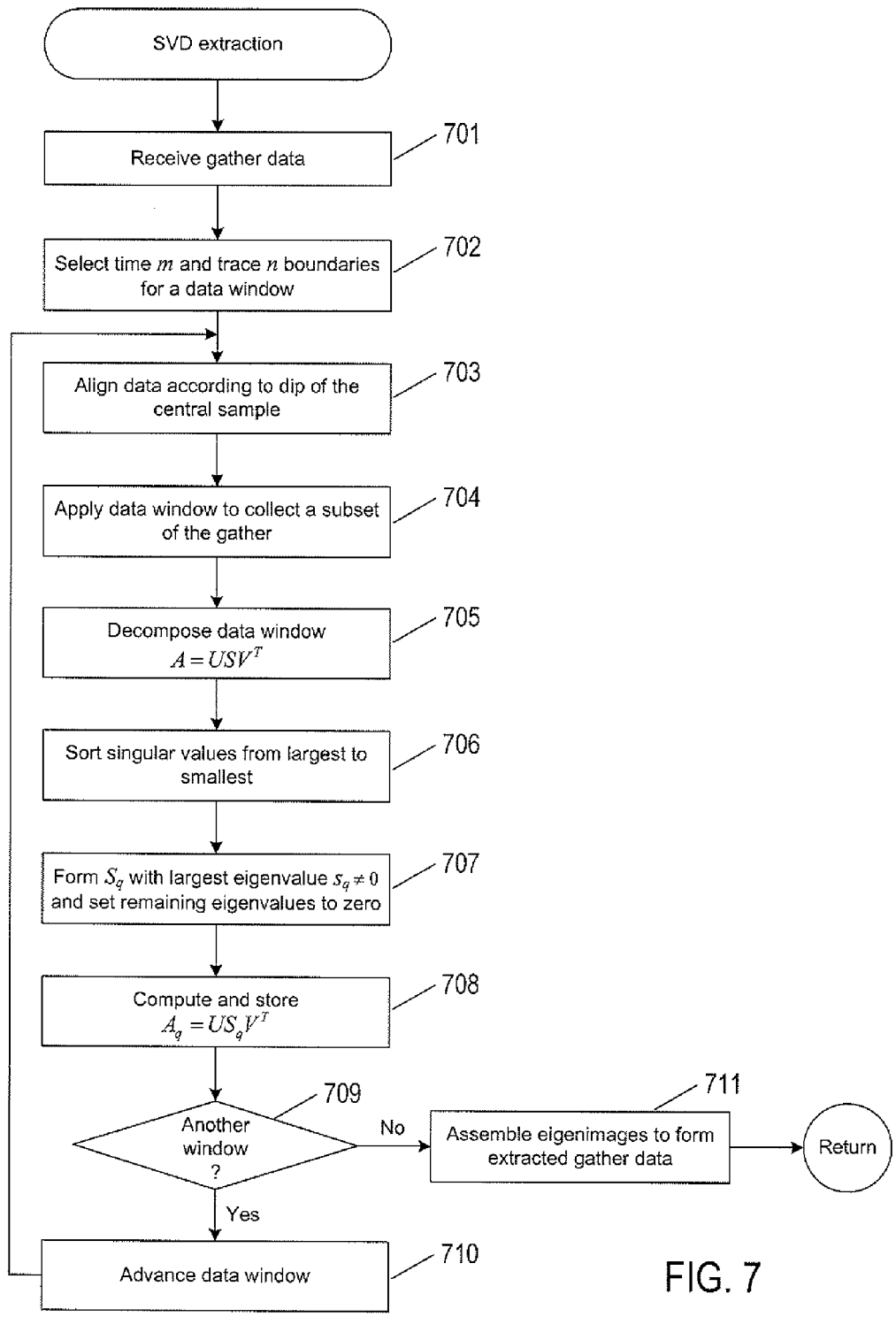
FIG. 7 shows a flow-control diagram of a method for SVD extraction.
Figure 8:
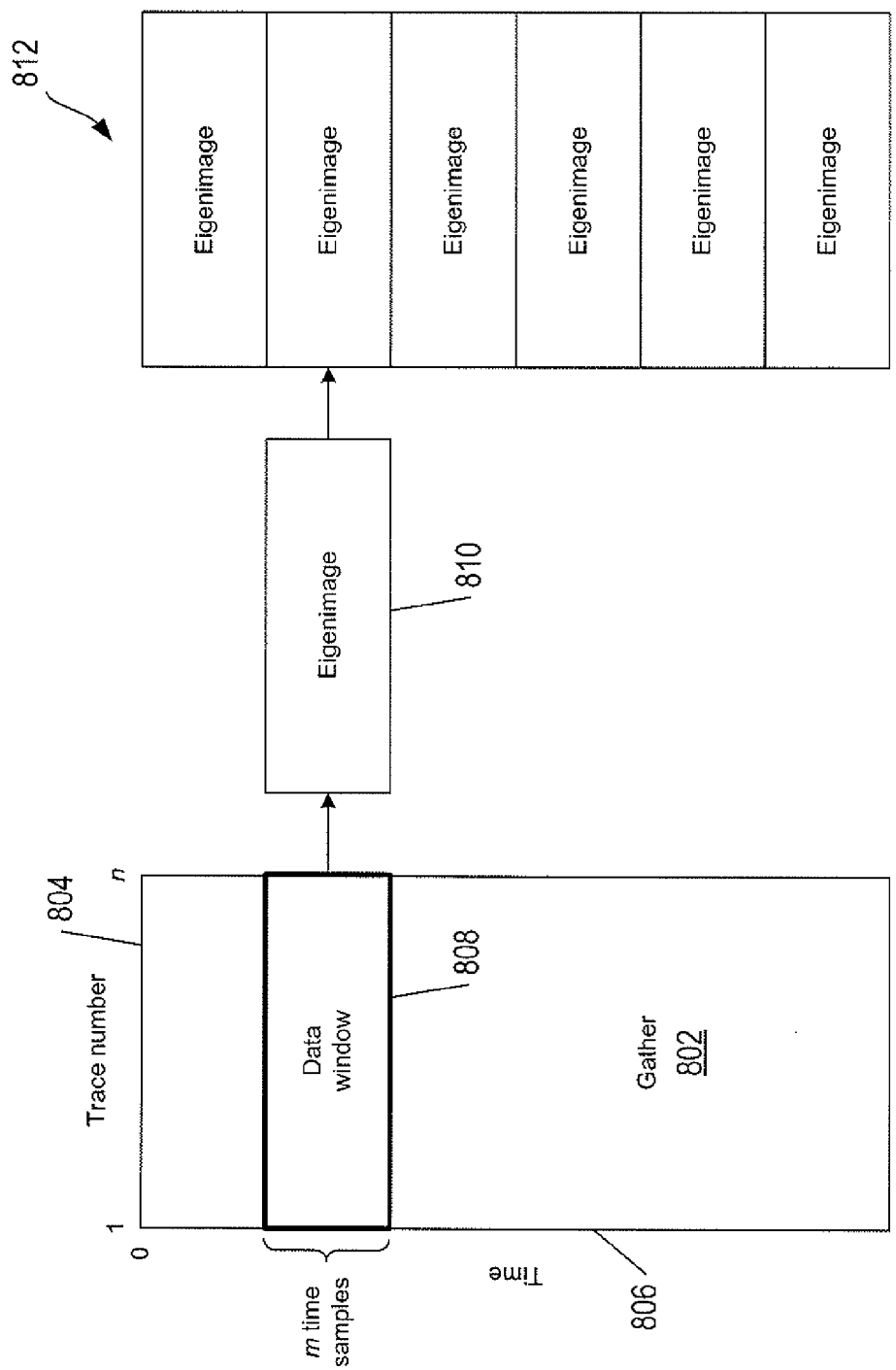
FIG. 8 shows a general example of SVD extraction performed on a seismic gather.

FIG. 7 shows a flow-control diagram of a method for SVD extraction called in blocks 508-510 of FIG. 5. In block 701, gather data is received. FIG. 8 shows a general example of SVD extraction performed on a gather 802. Horizontal axis 804 represents the trace indices, and vertical axis 806 represents time. The gather 802 may be, for example, a source-receiver gather, a common-receiver gather, or a common-midpoint gather. The gather 802 may contain the resulting output data $R(\vec{x}_r, t)$, the pressure data $P(\vec{x}_r, t)$, or the velocity data $V_{\vec{n}}(\vec{x}_r, t)$.

Returning to FIG. 7, in block 702, dimensions for a sliding data window are selected. The data window has a time sample dimension and a number of traces dimension. In FIG. 8, rectangle 808 represents a data window with n columns that correspond to n traces in the gather 802 and in rows that correspond to m time samples of the traces. In other words, data window 808 is an m×n sliding data window that is used to collect data subsets of the gather 802. Typically, the number of time samples is larger than the number of traces (i.e., m>n). The spatial dimension n of the data window 808 can range from 2 traces to the total number of traces comprising the gather 802.

Returning to FIG. 7, in block 703, the data for the n traces that fall in the data window are aligned according to the dip value determined for the central sample of the data window. In other words, after the operation of block 702 has been executed, data corresponding to the dip value is aligned horizontally. In block 704, gather data that lies within the boundaries of the data window is collected and, in block 705, decomposed according to SVD. FIG. 9 shows a mathematical representation of SVD. A matrix A 902 represents the gather data that lies within the boundaries of the data window 808 in FIG. 8. Each element in the matrix A corresponds to a time sampled trace in the data window 808. For example, a matrix element $\alpha_{\alpha\beta}$ of A represents the amplitude of the $\alpha$th time sample of the $\beta$th trace in the data window 808, where $\alpha$ is an integer that ranges from 1 to m and $\beta$ is an integer that ranges from 1 to n. As shown in FIG. 9, SVD decomposes the matrix A into a product of three matrices 904, where U is an m×n matrix, S is a n×n diagonal matrix, V is an n×n matrix, and the superscript T represents the complex conjugate transpose. The matrix U 906 contains n columns of mutually orthogonal, vertical eigenvectors $\vec{u}_\beta$ 908, each vector composed of in elements. The matrix V 910 also contains n columns of mutually orthogonal, vertical eigenvectors $\vec{v}_\beta$ 912, each vector composed of n elements. The matrix S 914 has n singular values $s_\beta$ located along the diagonal. Each singular value is the square root 916 of an eigenvalue $\epsilon_\beta$ of the covariance matrix of A.

Returning to FIG. 7, in block 706, the singular values are sorted from largest to smallest. Each singular value corresponds to an eigenimage of the gather data that lies with the data window. An eigenimage is calculated by:

$$A_\beta = U S_\beta V^T \quad (7)$$

where $S_\beta$ is the diagonal matrix S with all elements set equal to zero except for the singular value $s_\beta$; and $A_\beta$ is the eigenimage associated with the non-zero singular value $s_\beta$.

The eigenimages associated with each singular value are mutually orthogonal, which means the eigenimages have no information in common. Each eigenimage contains information that is common to all traces of gather data in the matrix A. For example, suppose all the traces (i.e., vertical columns) in the matrix A are the same. The matrix A is singular, only one singular value in the matrix S is not zero, and the matrix A is the eigenimage associated with the only non-zero singular value. Now suppose that all traces in the matrix A contain the same signals, but the signals have arbitrarily scaled amplitudes. In this case, the matrix A is singular and the eigenimage associated with the largest singular value contains the amplitude scaling information, which is a property that can be used to extract a local event from the gather. The local event corresponds to the most significant or largest dip at the central sample of the data window identified in the dip search.

In block 707, a matrix $S_q$ is formed by setting the singular values equal to zero except for the largest singular value determined in block 705. In block 708, an eigenimage is calculated for the largest singular value using Equation (11). The eigenimage $A_\beta$ associated with the largest singular value contains a local event corresponding to the selected dip. The eigenimages associated with the remaining singular values contain the remainder of the data. The criterion for selecting a local event depends on the way in which the slope is evaluated. For example, semblance can be used to determine the local slope. Semblance is described in "Semblance and other coherency measures for multichannel data," by N. S. Neidell and M. Turhan Taner, *Geophysics,* 1971, vol. 36, no. 3, p. 482-497 Selection of the local event can be improved by using analytic traces for the traces in the data window 808. In other words, the operation of block 708 may include a Hilbert transformation that is applied to each trace in the data window to convert real-valued traces to analytic traces. Constructing analytic traces are described in the "Complex seismic trace analysis," by M. T. Taner, F. Koehler, and R. E. Sheriff, Geophysics, 1979, vol. 44, no. 6, p. 1041-1063. By calculating the analytic trace, phase changes can be accounted for. In block 709, when the full set of gather data has not been collected, control flows to block 710; otherwise, control flows to block 711. In block 710, the data window is incrementally advanced to collect a different subset of the gather data and the operations in blocks 703-709 are repeated. In block 711, the eigenimages associated with each incremental advance of the data window through the gather data are assembled to form extracted gather data for the input gather data.

In FIG. 8, an eigenimage 810 of the gather data contained in the data window 808 is calculated according to Equation (11) using the largest singular value of the diagonal matrix S obtained for the gather data in the data window 808. The data window 808 is incrementally stepped through the full set of seismic gather data 802. At each incremental advance of the data window to a different subset of the gather data, SVD described in blocks 703-709 generates a corresponding eigenimage 810 associated with the largest singular value of the gather data that lies within the data window 808. The eigenimages are combined to construct an extracted gather data. In practice, only the central sample of the data window is stored, and not the data within the entire data window. The data window is advanced in block 710 by one sample and/or trace location. For example, the eigenimages in the extracted gather data 812 corresponds to just six of many data windows in the gather data 802.

Figure 10:
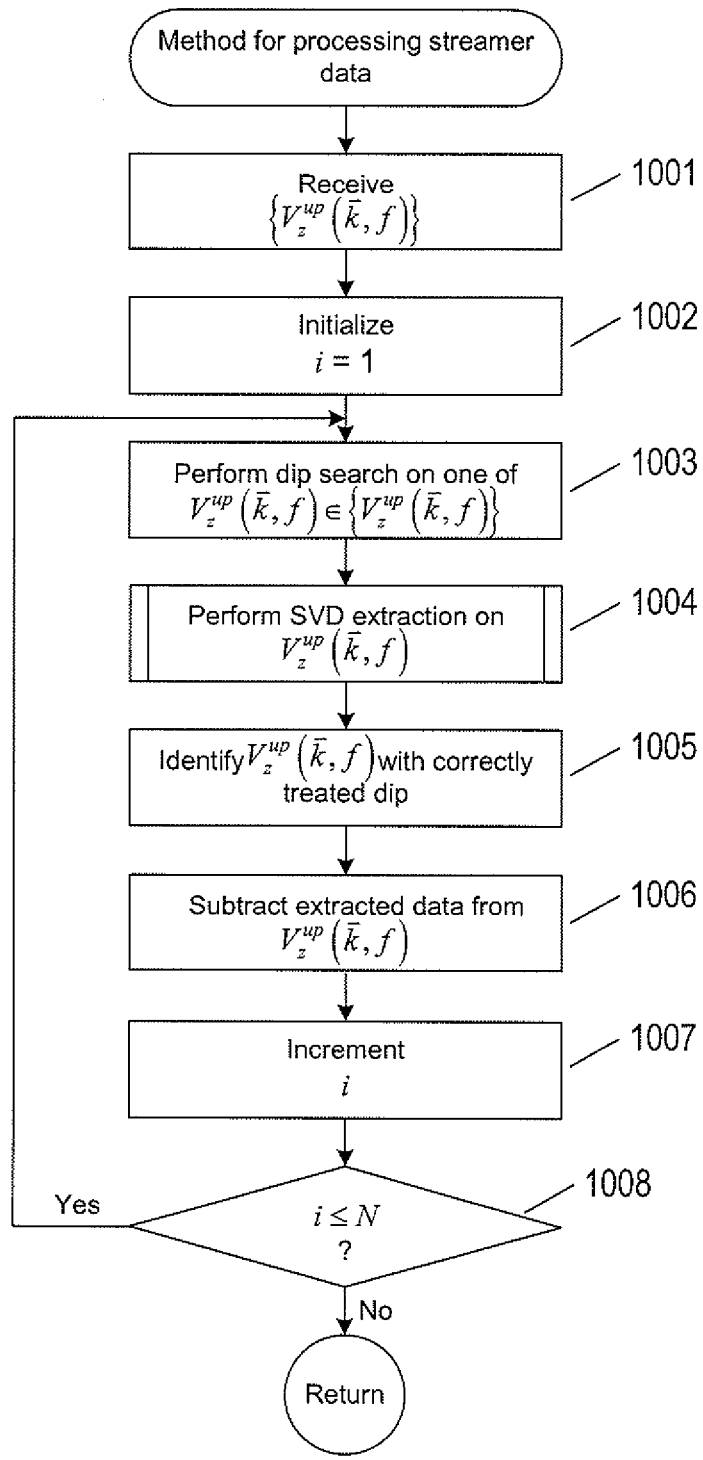
FIG. 10 shows a flow-control diagram of a method for frequency-wavenumber domain filtering and localized SVD applied to up-going particle velocity data.

FIG. 10 shows a flow-control diagram of a method for localized SVD applied to up-going particle velocity data. In block 1001, a set of up-going particle velocity data $\{V_z^{up}(\vec{k},f)\}$ is received. Each element $V_z^{up}(\vec{k},f)$ in the set is an up-going velocity wavefield for which a different range of dip values is treated correctly, which is accomplished by calculating the horizontal wavenumber considering a different linear moveout velocity for version of $V_z^{up}(\vec{k},f)$ data. The up-going velocity data $V_z^{up}(\vec{k},f$ can be calculated from:

$$V_z^{up}(\vec{k},f) = \frac{1}{2}\left(V_z(\vec{k},f) - \frac{k_z}{f\rho}P(\vec{k},f)\right) \quad (8)$$

where $$k_z = \sqrt{\frac{\omega^2}{c^2} - k_y^2 - k_x^2},$$

and $f\pi/k_z$ is the obliquity scaling.

Note that the in-line wavenumber $\tilde{k}_x$ is corrected in the f-k domain for shearing by $\tilde{k}_x = k_x + f \cdot p$ where p is the reciprocal of the linear moveout velocity. The filter can be applied to spatially aliased data. The velocity $V_z^{up}(\vec{k},f)$ is the up-going velocity wavefield in the f-k domain. In other words, $V_z^{up}(\vec{k},f)$ is the velocity wavefield with the receiver ghosts removed. It should also be noted that each member of the set $\{V_z^{up}(\vec{k},f)\}$ is the up-going velocity for different shearing velocities. Each member of the velocity data set $\{V_z^{up}(\vec{k},f)\}$ is correct for a different range of dips. In block 1002, a positive integer index i is initialized to one. Blocks 1003-1008 are repeated for the number of iterations N. The number of iterations N may be determined by a residual energy criterion. In block 1003, a dip search is performed on one of the velocity data $V_z^{up}(\vec{k},f)$ in the set $\{V_z^{up}(\vec{k},f)\}$ to generate a set of dip values. The dip values may be restricted to a range of values between −1/c and 1/c with c being the acoustic wave propagation velocity in water, which is typically about 1500 m/s. In block 1004, the routine "perform SVD extraction" described above with reference to FIG. 7 is called and SVD extraction is performed on all velocity data $V_z^{up}(\vec{k},f)$ in the set $\{_K^{up}(\vec{k},f)\}$. In block 1005, the particular velocity data in the set $\{V_z^{up}(\vec{k},f)\}$ for which the dip identified for the current data window is treated correctly is identified. In block 1006, the extracted data is subtracted from each velocity data $V_z^{up}(\vec{k},f)$ in the set $\{V_z^{up}(\vec{k},f)\}$ to give the set of residual up-going velocities given by:

$$\{V_{z,res}^{up}(\vec{k},f)\} \quad (9)$$

where $$V_{z,res}^{up}(\vec{k},f) = V_z^{up}(\vec{k},f) - V_{z,ex}^{up}(\vec{k},f), \text{ for each}$$
$$V_z^{up}(\vec{k},f) \text{ in the set } \{V_z^{up}(\vec{k},f)\}.$$

In block 1007, the index i is incremented, and when i is less than or equal to N in block 1009, the operations of blocks 1003-1007 are repeated. In other embodiments, a stop criterion in block 1008 may be when the residual energies falls below a predefined threshold of the original input data, as described above with reference to block 514 in FIG. 5.

Figure 11:
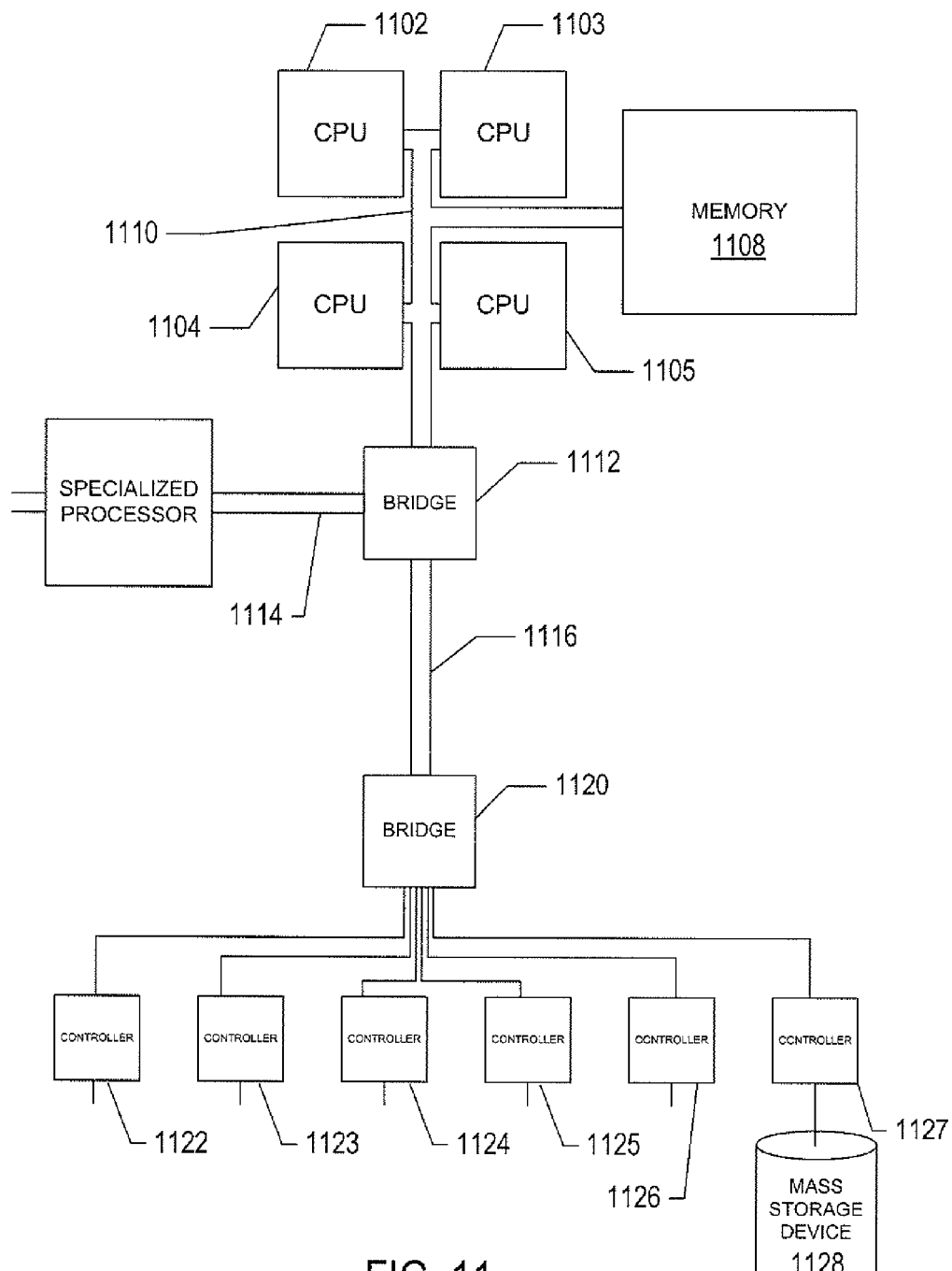
FIG. 11 shows an example of a generalized computer system that executes methods for processing seismic data.

FIG. 11 shows an example of a generalized computer system that executes efficient methods for filtering pressure and particle motion data and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1102-1105, one or more electronic memories 1108 interconnected with the CPUs by a CPU/memory-subsystem bus 1110 or multiple busses, a first bridge 1112 that interconnects the CPU/memory-subsystem bus 1110 with additional busses 1114 and 1116, or other types of high-speed interconnection media, including multiple, high-speed serial interconnects. The busses or serial interconnections, in turn, connect the CPUs and memory with specialized processors, such as a graphics processor 1118, and with one or more additional bridges 1120, which are interconnected with high-speed serial links or with multiple controllers 1122-1127, such as controller 1127, that provide access to various different types of computer-readable media, such as computer-readable medium 1128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1128 is a data-storage device, including electronic memory, optical or magnetic disk drive, USB drive, flash memory and other such data-storage device. The computer-readable medium 1128 can be used to store machine-readable instructions that encode the computational methods described above and can be used to store encoded data, during store operations, and from which encoded data can be retrieved, during read operations, by computer systems, data-storage systems, and peripheral devices.

The data-processing systems and methods described above produce a geophysical data product, which is the one or more non-transitory, computer-readable media that also includes the results of the computation methods describes above recorded thereon. The geophysical data product may also include instructions recorded thereon for transferring the data stored on the geophysical data product to another computer-readable medium for further processing. The geophysical data product may be produced offshore (i.e. by data-processing equipment on a survey vessel) or onshore (i.e. at a data-processing facility on land) either within the United States or in another country. When the geophysical data product is produced offshore or in another country, it may be imported onshore to a facility in the United States. Once onshore in the United States, geophysical analysis may be performed on the geophysical data product.

Results

Figures 12A, 12B:
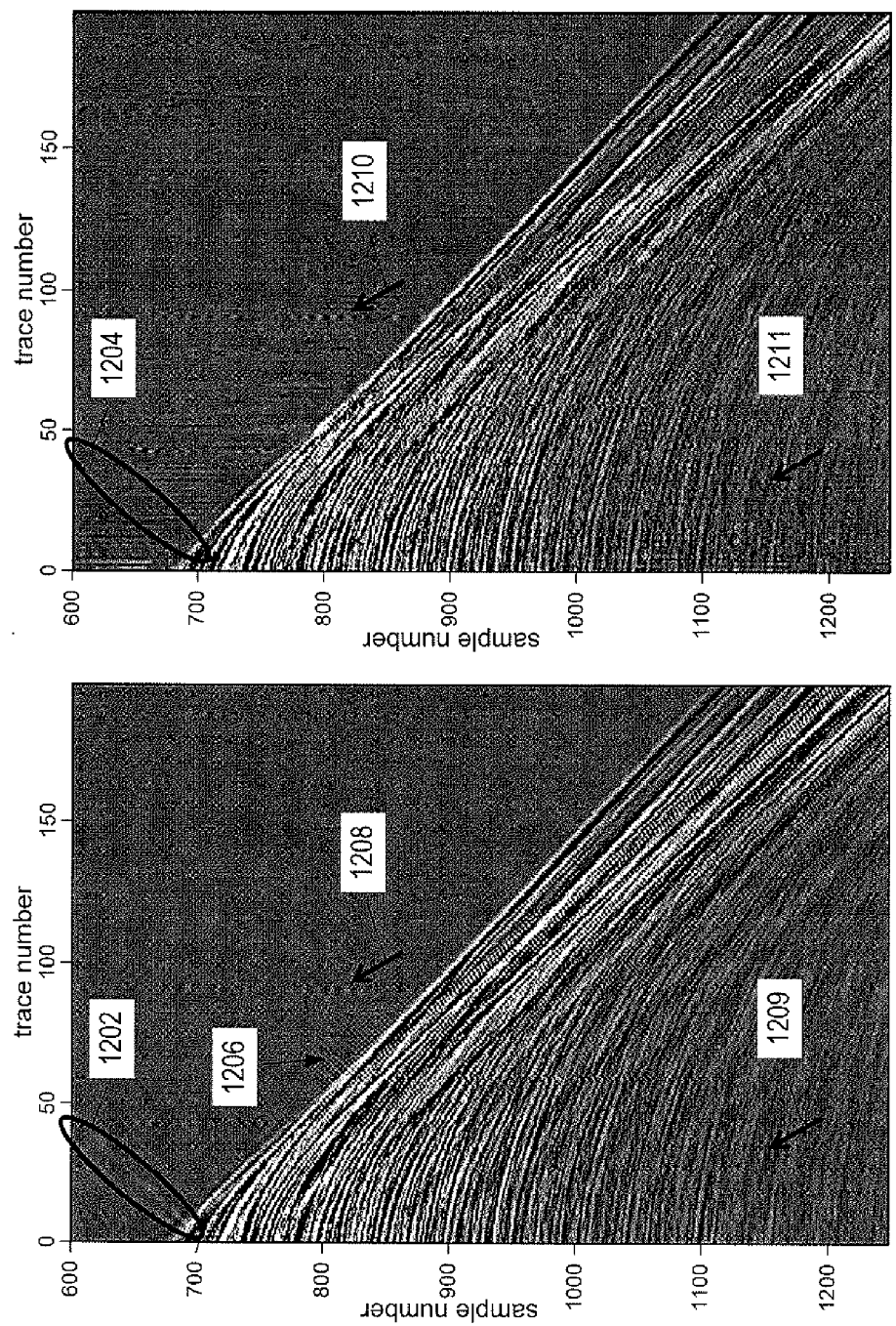
FIGS. 12A-12B show up-going pressure wavefield computational results.

FIG. 12A shows computational results for an up-going wavefields using conventional f-k domain wavefield separation. FIG. 12B shows computational results for an up-going wavefield using the computational method described above with reference to FIG. 5 using the same input pressure data and particle velocity data used to generate the conventional results shown in FIG. 12A. Comparison of the results displayed in FIGS. 12A and 12B reveal. Ellipse 1202 in FIG. 12A reveals an aperture edge effect. By contrast, ellipse 1204 in FIG. 12B reveals the aperture edge effect has been removed. Although FIG. 12B includes more noise, the noise stays local and not spread spatially with a crisscross pattern. For example, arrow 1206 identifies a crisscross pattern in FIG. 12A that is not present in FIG. 12B. Directional arrows 1208-1211 identify noise in FIGS. 12A and 12B, but noise identified by directional arrows 1208 and 1209 in FIG. 12A is spread spatially, whereas the noise identified by directional arrows 1210 and 1211 is narrower.

Figures 13A, 13B:
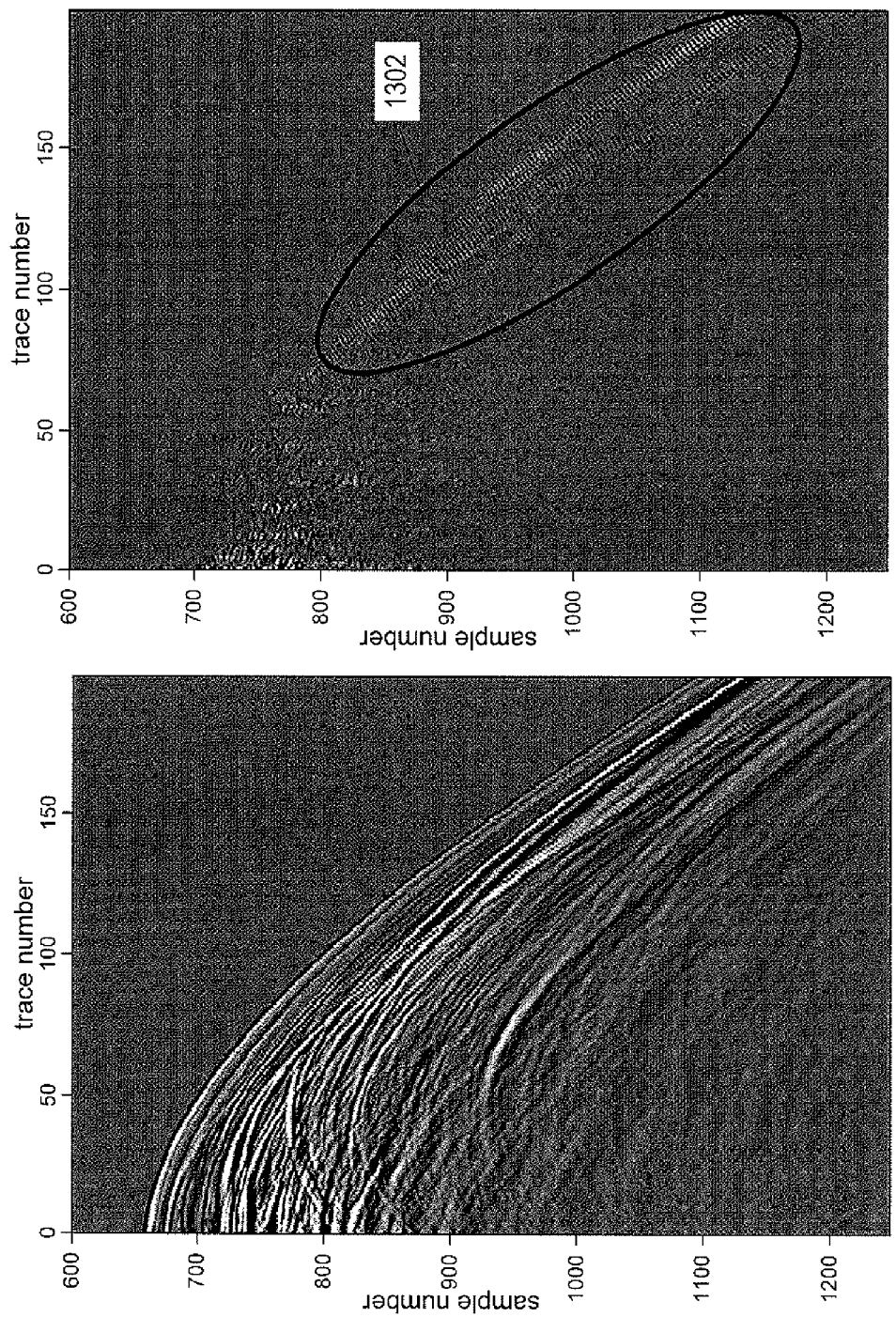
FIGS. 13A-13B show an up-going wavefield and difference to output of standard frequency-wavenumber domain generation.

FIG. 13A show computational results for an up-going wavefield using the computational method described above with reference to FIG. 10. FIG. 13B shows the difference between results shown in FIG. 13A and the output of the up-going wavefield calculated using conventional wavefield separation and the same input pressure data and velocity data used to generate the conventional results shown in FIG. 13A. The results indicate that there is no coherent energy present that would indicate a failure in correct signal treatment of the method. An ellipse 1302 identifies differences (i.e., energy not picked up by the SVD decomposition) that primarily occur on high dip value events which are aliased and better treated using the method described above with reference to FIG. 10.

Embodiments described above are not intended to be limited to the descriptions above. For example, any number of different computational-processing-method implementations that carry out the methods described above for filtering pressure and velocity data may be designed and developed using various different programming languages and computer platforms and by varying different implementation parameters, including control structures, variables, data structures, modular organization, and other such parameters. The computational representations of wavefields, operators, and other computational objects may be implemented in different ways. The systems and methods can be executed in near-real time while conducting a marine survey of a subterranean formation. The term "near-real time" refers to a time delay due to data transmission and data processing that is short enough to allow timely use of the processed data during further data acquisition. For example, near-real time can refer to a situation in which the time delay due to transmission and processing is insignificant. In other words, near-real time approximates real time when the time for data transmission and data processing appears imperceptible. Near-real time can also refer to a perceptible time delay for data transmission and data processing but the time delay is not so long that quality control cannot be executed.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for filtering seismic data using one or more programmable computers programmed to at least perforin the operations of:
    receiving pressure data and velocity data generated by one or more multi-component sensors of one or more streamers towed by a survey vessel;
    initializing values of a filtered wavefield to zero;
    for a number of iterations,
        applying one or more filters to the pressure data and velocity data to generate a first filtered wavefield;
        applying singular value decomposition ("SVD") to the first filtered wavefield to generate an extracted wavefield;
        updating the filtered wavefield based on the extracted wavefield to reduce noise in the filtered wavefield;
        applying SVD to the pressure data and the velocity data to generate corresponding extracted pressure data and extracted velocity data;
        adjusting the pressure and velocity data based on extracted pressure data and extracted velocity data; and
        storing the filtered wavefield in one or more computer-readable media.

2. The method of claim 1, further comprising for the number of iterations, applying the one or more filters to the pressure data and velocity data to generate the filtered wavefield in the frequency-wavenumber domain; and applying SVD to the filtered wavefield to generate the extracted wavefield in the space-time domain.

3. The method of claim 1, wherein adjusting the pressure and velocity data further comprises:

subtracting the extracted pressure data from the pressure data; and subtracting the extracted velocity data from the velocity data.

4. The method of claim 1, further comprising performing a dip search on one or more of the pressure and velocity data with dip values between −1/c and 1/c, where c represents the acoustic wave propagation velocity in water and the dip value.

5. The method of claim 1, wherein applying SVD to one of the first filtered wavefield, the pressure data, and the velocity data further comprises:

for each incremental advance of a data window through one of the first filtered wavefield, the pressure data, and the velocity data, collecting a subset of data within the data window;

horizontally aligning the data according to a dip value of a central sample in the data window;

applying SVD to the data within the data window to generate singular values;

sorting the singular values from largest to smallest; and computing an eigenimage that corresponds to the largest singular value; and combining the eigenimages for each incremental advance of the data window to form one of the extracted wavefield, the extracted pressure data, and the extract velocity data.

6. The method of claim 1, further comprises receiving pressure data and velocity data and generating the filtered wavefield with reduced noise in near real time on board a survey vessel.

7. The method of claim 1, wherein the number of iterations is user specified.

8. The method of claim 1, wherein updating the filtered wavefield based on the extracted wavefield further comprises adding the extracted wavefield to the filtered wavefield.

9. A computer system for filtering and reducing noise in seismic data, the computer system comprising:

one or more processors;

one or more data-storage devices; and a routine stored in one or more of the one or more data-storage devices and executed by the one or more processors, the routine directed to:

receiving pressure data and velocity data generated by one or more multi-component sensors of one or more streamers towed by a survey vessel;

initializing values of a filtered wavefield to zero;

for a number of iterations, applying one or more filters to the pressure data and velocity data to generate a first filtered wavefield;

applying singular value decomposition ("SVD") to the first filtered wavefield to generate an extracted wavefield;

updating the filtered wavefield based on the extracted wavefield to reduce noise in the filter wavefield;

applying SVD to the pressure data and the velocity data to generate corresponding extracted pressure data and extracted velocity data;

adjusting the pressure and velocity data based on extracted pressure data and extracted velocity; and storing the filtered wavefield in the one or more computer-readable media.

10. The system of claim 9, further comprising for the number of iterations, applying the one or more filters to the pressure data and velocity data to generate the filtered wavefield in the frequency-wavenumber domain; and applying SVD to the filtered wavefield to generate the extracted wavefield in the space-time domain.

11. The system of claim 9, wherein adjusting the pressure and velocity data further comprises:

subtracting the extracted pressure data from the pressure data; and subtracting the extracted velocity data from the velocity data.

12. The system of claim 9, further comprises performing a dip search on one or more of the pressure and velocity data with dip values between −1/c and 1/c, where c represents the acoustic wave propagation velocity in water and the dip value.

13. The system of claim 9, wherein applying SVD to one of the first filtered wavefield, the pressure data, and the velocity data further comprises:

for each incremental advance of a data window through one of the first filtered wavefield, the pressure data, and the velocity data, collecting a subset of data within the data window;

horizontally aligning the data according to a dip value of a central sample in the data window;

applying SVD to the data within the data window to generate singular values;

sorting the singular values from largest to smallest; and computing an eigenimage that corresponds to the largest singular value; and combining the eigenimages for each incremental advance of the data window to form one of the extracted wavefield, the extracted pressure data, and the extract velocity data.

14. The system of claim 9, further comprises receiving pressure data and velocity data and generating the filtered wavefield with reduced noise in near real time on board a survey vessel.

15. The system of claim 9, wherein the number of iterations is user specified.

16. The system of claim 9, wherein updating the filtered wavefield based on the extracted wavefield farther comprises adding the extracted wavefield to the filtered wavefield.

17. A non-transitory computer-readable medium having machine-readable instructions that determine structural information about a subterranean formation encoded thereon for enabling one or more processors of a computer system to perform the operations of:

receiving a set of wavefields;

initializing values of a filtered wavefield to zero;

for a number of iterations, performing a dip search on a wavefield in the set of wavefields to generate one or more dip values;

applying singular value decomposition ("SVD") to the wavefield to generate an extracted wavefield based on the one or more dip values;

adding the extracted wavefield to the filtered wavefield to update the filtered wavefield, reducing noise in the filtered wavefield;

subtracting the extracted wavefield from each wavefield in the set of wavefields; and generating an image of the subterranean formation using at least in part the filtered wavefield, the image revealing structural information about the subterranean formation.

18. The medium of claim 17, wherein performing the dip search on the wavefield further comprises determining dip values between $-1/c$ and $1/c$, where c represents the acoustic wave propagation velocity in water and the dip value.

19. The medium of claim 17, wherein applying SVD to the wavefield further comprises:

for each incremental advance of a data window through the wavefield,
collecting a subset of wavefield data within the data window;
horizontally aligning the wavefield data according to a dip value of a central sample in the data window;
applying SVD to wavefield data within the data window;
sorting the singular values from largest to smallest; and
computing an eigenimage that corresponds to the largest singular value; and combining the eigenimages for each incremental advance of the data window to form the extracted wavefield.

20. The medium of claim 17, further comprises receiving the set of wavefields and generating the filtered wavefield with reduced noise in near real time on board a survey vessel.

21. The medium of claim 17, wherein the number of iterations is user specified.

22. A method for generating a geophysical data product, the method comprising:

receiving pressure data and velocity data generated by one or more multi-component sensors of one or more streamers towed by a survey vessel; and processing the seismic data using a programmable computer that is programmed to generate the geophysical data product, wherein the processing includes:
initializing values of a filtered wavefield to zero;
for a number of iterations,
applying one or more filters to the pressure data and velocity data to generate a first filtered wavefield;
applying singular value decomposition ("SVD") to the first filtered wavefield to generate an extracted wavefield;
updating the filtered wavefield based on the extracted wavefield to reduce noise in the filtered wavefield;
applying SVD to the pressure data and the velocity data to generate corresponding extracted pressure data and extracted velocity data;
adjusting the pressure and velocity data based on extracted pressure data and extracted velocity data; and
storing the filtered wavefield in one or more computer-readable media.

23. The method of claim 22, further comprising for the number of iterations,
applying the one or more filters to the pressure data and velocity data to generate the filtered wavefield in the frequency-wavenumber domain; and
applying SVD to the filtered wavefield to generate the extracted wavefield in the space-time domain.

24. The method of claim 22, wherein adjusting the pressure and velocity data further comprises:
subtracting the extracted pressure data from the pressure data; and
subtracting the extracted velocity data from the velocity data.

25. The method of claim 22, further comprises performing a dip search on one or more of the pressure and velocity data with dip values between $-1/c$ and $1/c$, where c represents the acoustic wave propagation velocity in water and the dip value.

26. The method of claim 22, wherein applying SVD to one of the first filtered wavefield, the pressure data, and the velocity data further comprises:
for each incremental advance of a data window through one of the first filtered wavefield, the pressure data, and the velocity data,
collecting a subset of data within the data window;
horizontally aligning the data according to a dip value of a central sample in the data window;
applying SVD to the wavefield data within the data window to generate singular values;
sorting the singular values from largest to smallest; and
computing an eigenimage that corresponds to the largest singular value; and
combining the eigenimages for each incremental advance of the data window to form one of the extracted wavefield, the extracted pressure data, and the extract velocity data.

27. The method of claim 22, wherein the number of iterations is user specified.

* * * * *